US006964376B1

(12) United States Patent
Register

(10) Patent No.: US 6,964,376 B1
(45) Date of Patent: Nov. 15, 2005

(54) SERIALIZED DATA PLATE FOR OUTDOOR EQUIPMENT AND THE LIKE

(76) Inventor: John W. Register, 5919 Martha's Glen Rd., Columbia, SC (US) 29209

( * ) Notice: Subject to any disclaimer, the term of this patent is extended or adjusted under 35 U.S.C. 154(b) by 0 days.

(21) Appl. No.: 10/438,959

(22) Filed: May 15, 2003

Related U.S. Application Data

(60) Provisional application No. 60/394,595, filed on Jul. 9, 2002.

(51) Int. Cl.[7] ............................................. G06K 19/00
(52) U.S. Cl. ....................... 235/487; 235/488; 283/109
(58) Field of Search ................................. 235/487, 488, 235/462.01; 283/101, 107, 109, 110, 111

(56) References Cited

U.S. PATENT DOCUMENTS

| 4,109,047 A | * | 8/1978 | Fredrickson | ................ 503/205 |
| 4,827,643 A | * | 5/1989 | Hearst et al. | ................. 40/306 |
| 4,951,970 A | | 8/1990 | Burt | ............................. 283/67 |
| 5,083,979 A | | 1/1992 | Burt | ............................. 283/67 |
| 6,082,620 A | * | 7/2000 | Bone, Jr. | ............... 235/462.16 |
| 6,656,555 B1 | * | 12/2003 | McKillip | ................... 428/40.1 |

* cited by examiner

Primary Examiner—Daniel Stcyr
(74) Attorney, Agent, or Firm—Nelson Mullins Riley & Scarborough, LLP

(57) ABSTRACT

The present invention provides an improved data plate for use with outdoor equipment, industrial machinery, or the like. A data plate of the present invention is formed as a multilayer assembly having a durable cover layer overlying a label on which the variable indicia (e.g., the unit-specific information) has been printed. Typically, the cover layer will be formed of a transparent polymeric material to which predetermined fixed indicia has been applied.

7 Claims, 4 Drawing Sheets

SERIALIZED DATA PLATE FOR OUTDOOR EQUIPMENT AND THE LIKE

PRIORITY CLAIM

This application claims priority to U.S. Provisional Application Ser. No. 60/394,595, filed Jul. 9, 2002, which is incorporated herein by reference.

BACKGROUND OF THE INVENTION

The present invention relates generally to the art of data plates attached to outdoor equipment for display of variable indicia such as product numbers and serial numbers.

Aluminum data plates are widely used by manufacturers of outdoor equipment such as barbecue grills to display both fixed and variable indicia. Fixed indicia is information that does not change from unit to unit, such as the name, address and telephone number of the manufacturer. In contrast, variable indicia, such as serial number or other serialized information, will generally be unique to the particular unit (or at least to the particular model).

While aluminum data plates have worked generally well for their intended purpose, they do have certain drawbacks. Because aluminum is opaque, for example, the fixed indicia must be printed on the outer surface of the plate itself (typically by screen printing). As a result, the fixed indicia may become damaged over time, such as due to scratching or peeling.

In addition, the variable indicia is generally stamped into the surface of the plate using specialized stamping equipment. The investment in such specialized equipment is difficult for many manufacturers, particularly smaller companies having limited resources. As an alternative, the stamping could be performed by the vendor supplying the data plates to the manufacturer. However, this will require the manufacturer to predict well in advance the specific serialized information that will be needed.

SUMMARY OF THE INVENTION

The present invention recognizes and addresses various drawbacks of prior art constructions and methods.

Accordingly, the present invention provides an improved data plate for use with outdoor equipment, industrial machinery, or the like. A data plate of the present invention is formed as a multilayer assembly having a durable cover layer overlying a label on which the variable indicia (e.g., the unit-specific information) has been printed. Typically, the cover layer will be formed of a transparent polymeric material to which predetermined fixed indicia has been applied.

It will often be preferable to apply the fixed indicia on the back surface of the cover layer to enhance its durability. In such embodiments, a layer of suitable adhesive is preferably provided over the fixed indicia to both protect the fixed indicia and provide a means of attaching the data plate to the surface of the equipment. Moreover, transparent windows are preferably provided in predetermined locations in the cover layer to allow the variable indicia to be seen.

The label is also preferably made of a durable polymeric material to which the variable indicia has been applied. In many cases, it will be possible to print the variable indicia on-site using a laser printer or other conventional computer printer as are in widespread use. The variable indicia on the label is located so as to be in registry with the windows in the cover layer. Preferably, the label will be dimensioned to leave a margin on the underside of the cover layer to facilitate attachment to the outdoor equipment or other surface.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

DETAILED DESCRIPTION OF PREFERRED EMBODIMENTS

Reference is made in detail to presently preferred embodiments of the invention, one or more examples of which are illustrated in the accompanying drawings. Each example is provided by way of explanation of the invention. In fact, it will be apparent to those skilled in the art that modifications and variations can be made in the present invention without departing from the scope or spirit thereof. For example, features illustrated or described as part of one embodiment may be used on another embodiment to yield a still further embodiment.

Figure 1:
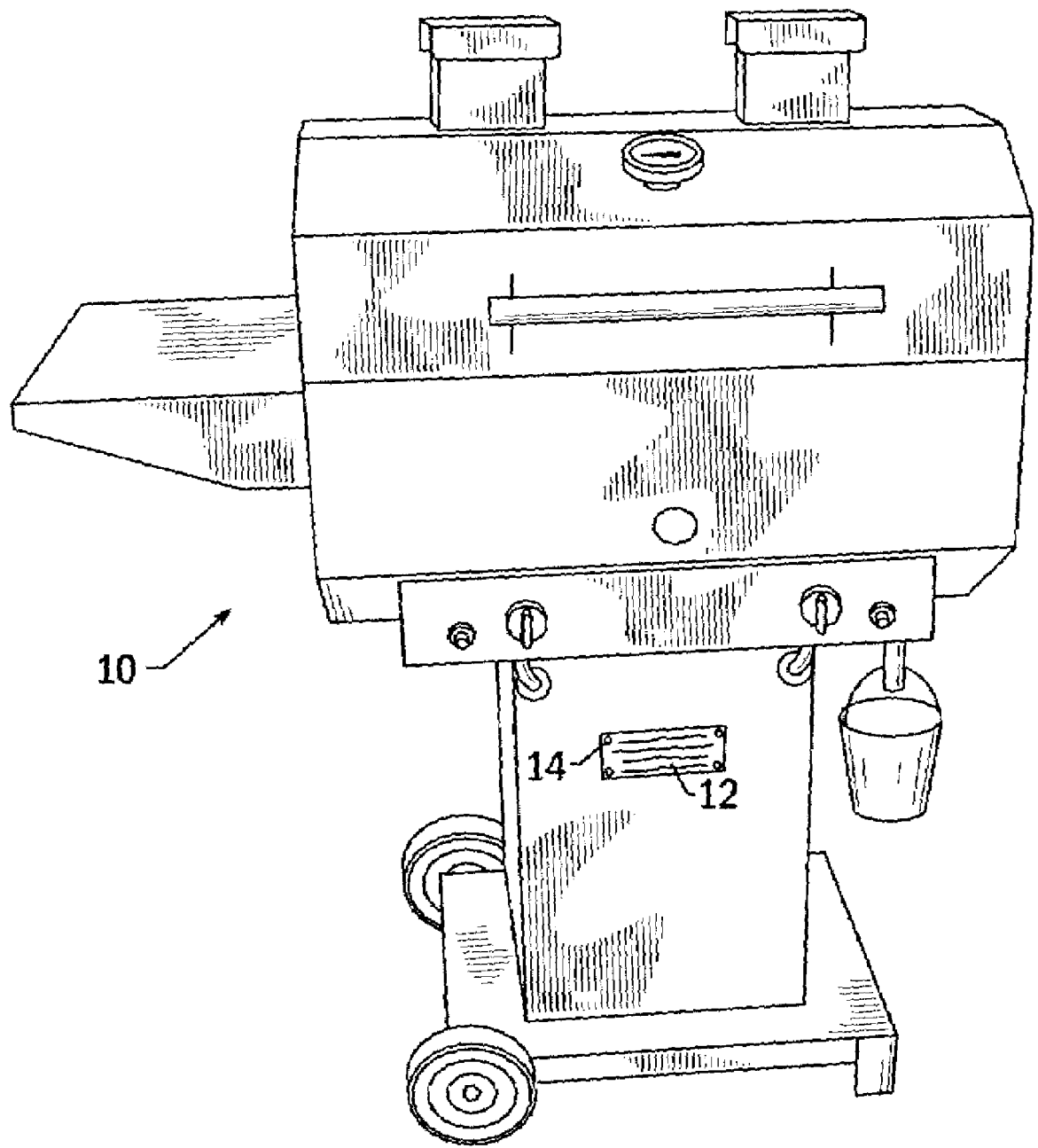
FIG. 1 is a perspective view of a barbecue grill with a prior art aluminum data plate attached by rivets in the typical manner.
Figure 2:
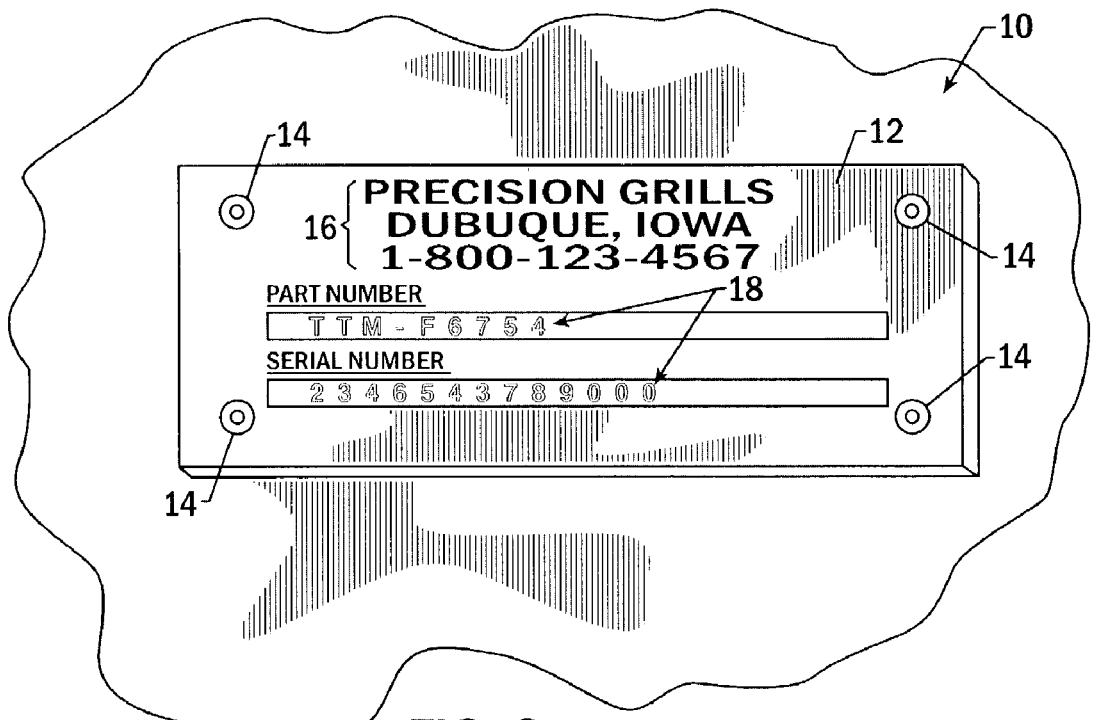
FIG. 2 is an enlarged view of the prior art data plate shown in FIG. 1.

Referring now to FIGS. 1 and 2, a barbecue grill 10 includes an aluminum data plate 12 of the prior art. Data plate 12 is attached in the typical manner by four rivets 14, located near its corners. As can be seen most clearly in FIG. 2, data plate 12 includes fixed indicia 16 common to all data plates. In this case, for example, fixed indicia 16 may include the name, address and telephone number of the grill manufacturer. As explained above, fixed indicia 16 is produced by screen printing on the top face of plate 12. Because fixed indicia 16 is located on the top face of plate 12, it can be susceptible to damage over the long term.

Data plate 12 also includes variable indicia 18 to provide unit-specific information, such as serial number. As discussed above, variable indicia 18 is stamped into plate 12 using specialized stamping equipment. Because such stamping equipment can be costly, many manufacturers may choose to have the serialization process performed by the data plate vendor. Due to the required lead times and other factors, however, this can require the manufacturer to engage in considerable advance planning of anticipated need.

Figure 3:
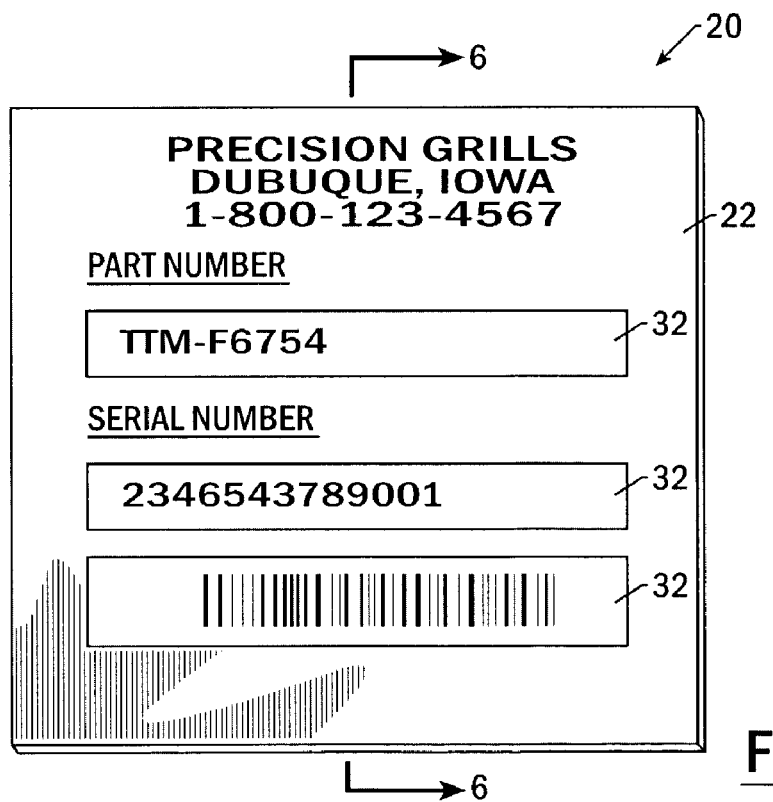
FIG. 3 is a front plan view of a data plate constructed in accordance with an embodiment of the present invention.
Figure 4:
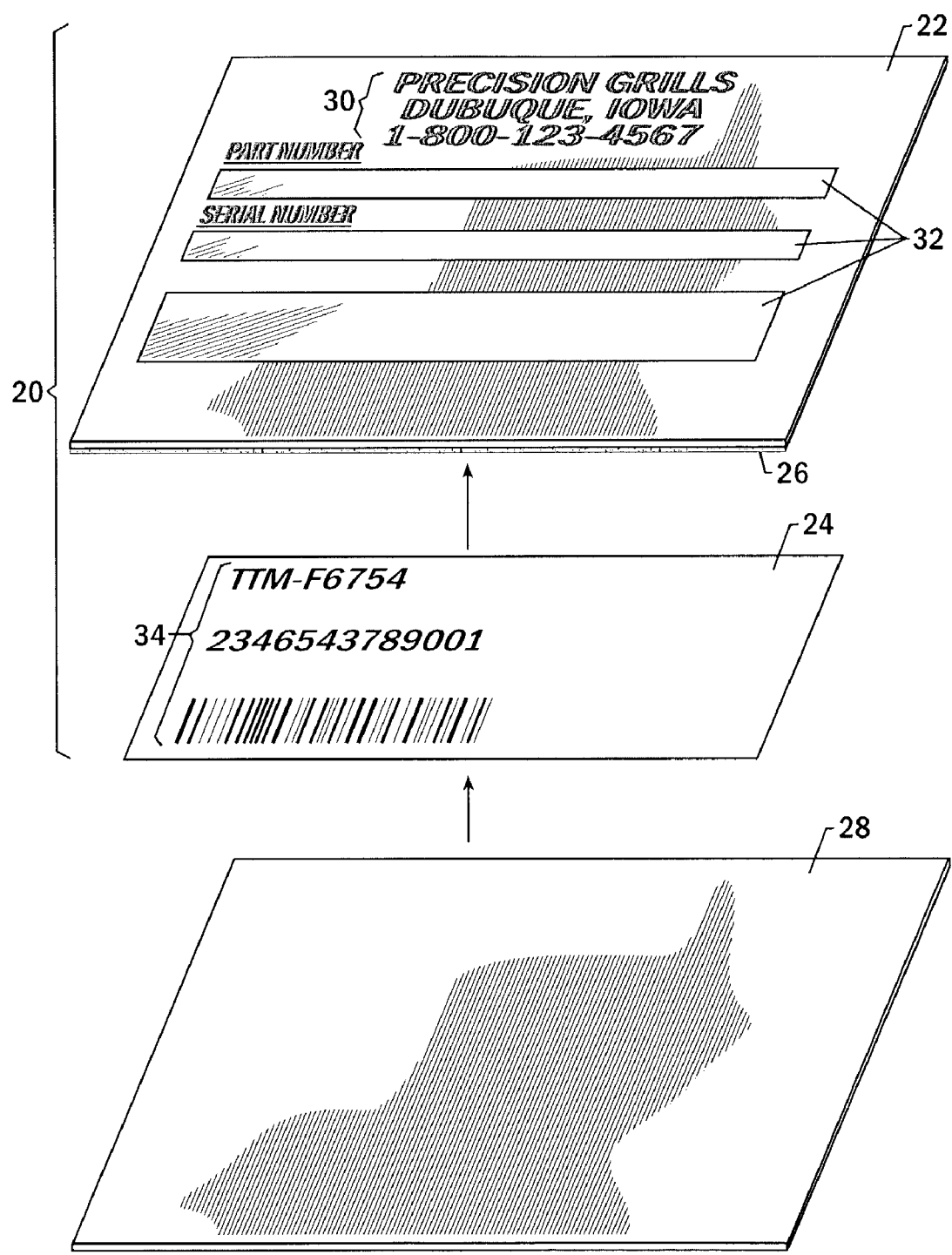
FIG. 4 is an exploded view showing the combination of the cover layer, the label and a release liner.

FIGS. 3 and 4 illustrate a data plate 20 made in accordance with the present invention. Data plate 20 is constructed as a multilayer assembly having a cover layer 22 overlying a label 24. A layer 26 of adhesive is provided in this case on the back of cover layer 22. A release liner 28 may be provided to cover the adhesive prior to use.

Preferably, cover layer 22 will be made from a sheet of outdoor durable and transparent polymeric material which has been cut to the desired size. A polycarbonate material is believed to be particularly advantageous for this purpose because of its excellent UV resistance. For example, some suitable polycarbonate materials will block at least 97% of the UV rays that would otherwise pass through. The thickness of cover layer 22 can vary, but will often fall in a range of 3 mils to 30 mils. An especially preferred thickness is 10 mils. One skilled in the art will appreciate that suitable polycarbonate sheet materials are available from Bayer and GE.

In cases where cover layer 22 is made of a transparent material, fixed indicia 30 may be printed on the back. This will advantageously protect fixed indicia 30 from damage due to scratching as well as sunlight and the natural elements. For example, fixed indicia 30 may be printed in black with a white background covering much of the remainder of the back surface of cover layer 22. Preferably, predetermined regions of the back surface will not be painted in order to leave one or more transparent windows 32. As can be seen, fixed indicia 30 will often include such things as the name, address and telephone number of the manufacturer.

In the illustrated embodiment, the paint on the back surface of cover layer 22 is then laminated with adhesive material 26. In addition to its main purpose of attaching data plate 20, adhesive material 26 also serves as a gasket to further protect variable indicia 34. One adhesive that is particularly preferred for this purpose is 468 adhesive available from 3M. Surprisingly, it has been found that such an adhesive is virtually as durable as rivets when applied to certain surfaces, even in demanding outdoor applications.

As shown, variable indicia 34 is printed on the surface of label 24 so as to be in registry with transparent windows 32 of cover layer 22. Variable indicia 34 may include information (such as serial number) that is commonly stamped onto aluminum data plates of the prior art. The present invention, however, provides flexibility to also print other types of information that cannot be stamped, such as a bar code. Label 24 is preferably made of a suitable polymeric material, such as polyester.

Figure 5:
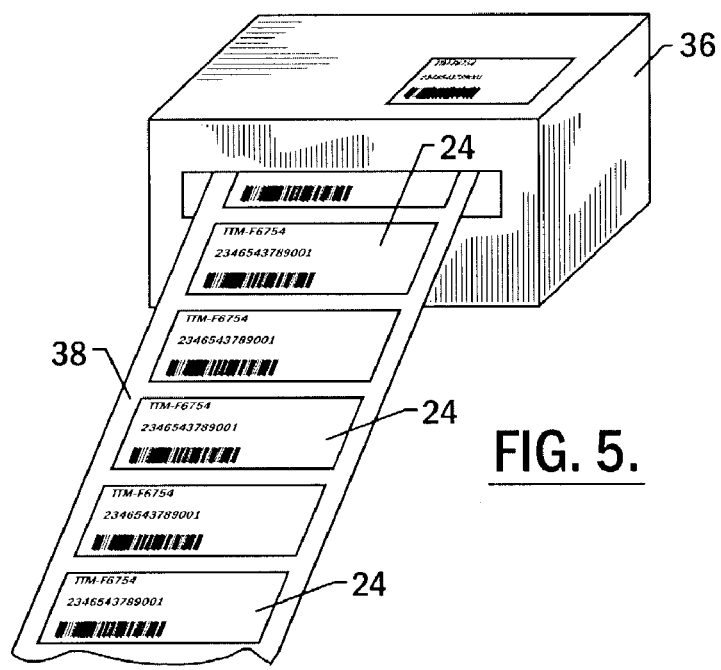
FIG. 5 is a perspective view of a laser printer showing the printing of variable indicia on a string of labels located on a carrier sheet.

Many embodiments of the present invention permit on-site printing of the variable indicia using ubiquitous computer printers found in almost any business facility. In this regard, FIG. 5 illustrates a common laser printer 36 that is functioning to print the variable indicia on a succession of labels 24. Advantageously, the carbon toner used in such printers has been found to have sufficient durability in outdoor environments. As can be seen, the labels themselves are located on a suitable carrier sheet 38.

Referring again to FIG. 4, it is contemplated in one manner of use that the preprinted cover layers 22 may be supplied to the manufacturer of outdoor equipment with adhesive 26 directly covered by release liner 28. A plurality of blank labels 24 are also separately provided to the manufacturer. After the variable indicia is printed on-site, release liner 28 is removed from the bottom of cover layer 22. The respective label 24 is positioned under cover layer 22 with the variable indicia in registry with windows 32.

Figure 6:
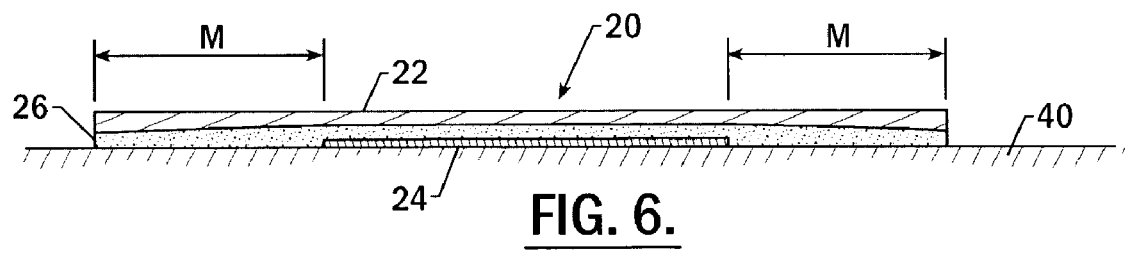
FIG. 6 is a section view along line 6—6 of FIG. 3.

FIG. 6 is a cross sectional view showing data plate 20 attached to a machine surface 40. As shown, label 24 is dimensioned in this case to leave a margin M at which adhesive 26 is exposed to surface 40. In this manner, the entire multilayer assembly can be attached to surface 40. The multilayer assembly also protects the label and is watertight. As one skilled in the art will appreciate, the material of label 24 will preferably be very thin to reduce the required span of adhesive 26. For example, label 24 may be no thicker than 4 mils (preferably 2 mils) in some presently preferred embodiments. In many cases, label 24 may also have a permanent adhesive on its back surface.

It can thus be seen that the present invention provides a windowed serialized data plate having novel properties. In addition to eliminating the need for special stamping equipment, data plates made in accordance with the present invention are generally much less expensive than aluminum data plates. Moreover, an assortment of different types of variable indicia can be printed without the need for complicated setup procedures. The present invention thus gives significantly enhanced flexibility in comparison with the prior art.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the following claims.

What is claimed is:

1. A data plate for use with outdoor equipment or industrial machinery, said data plate comprising:
   a label on which variable indicia has been applied;
   a cover layer having a back side attached to said label, said cover layer having a transparent portion, in a location to allow the variable indicia to be seen therethrough;
   an adhesive layer applied between said back side of said cover layer and said label; and
   said label being dimensioned to leave a margin on said back side of said cover layer so that a portion of said adhesive layer is exposed around a periphery of said label, wherein fixed indicia has been applied to said back side of said cover layer.

2. The data plate as recited in claim 1, wherein said cover layer and said label are formed from a polymeric material.

3. The data plate as recited in claim 1, wherein said cover layer has at least two transparent windows at predetermined locations in registry with said variable indicia.

4. The data plate as recited in claim 1, wherein the variable indicia is applied to said label using a computer printer.

5. The data plate as recited in claim 1, wherein the variable indicia includes a bar code.

6. A data plate for use with outdoor equipment or industrial machinery, said data plate comprising:
   a label on which variable indicia has been applied;
   a transparent cover layer having a back side to which fixed indicia has been applied; and
   an adhesive layer applied to said back side of said cover layer over the fixed indicia for attaching said label to said cover layer,
   wherein said label is dimensioned to leave a margin on said back side of said cover layer so that a portion of said adhesive layer is exposed around a periphery of said label.

7. The data plate as recited in claim 6, further comprising a release liner attached to said adhesive layer.

* * * * *